US006892841B2

(12) United States Patent
Makuta et al.

(10) Patent No.: US 6,892,841 B2
(45) Date of Patent: May 17, 2005

(54) WHEEL STRUCTURE

(75) Inventors: Yohei Makuta, Saitama (JP); Shinji Takayanagi, Saitama (JP); Tomokazu Sakamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/213,082

(22) Filed: Aug. 7, 2002

(65) Prior Publication Data

US 2003/0047363 A1 Mar. 13, 2003

(30) Foreign Application Priority Data

Sep. 7, 2001 (JP) ........................................ 2001-271640

(51) Int. Cl.[7] .............................................. B60K 1/00
(52) U.S. Cl. ........................ 180/65.5; 301/6.1; 310/77
(58) Field of Search .............................. 180/65.1, 65.5; 310/66, 67 R, 67 A, 75 R, 77; 301/6.1, 6.5, 6.6, 6.7; 280/65.5

(56) References Cited

U.S. PATENT DOCUMENTS

| 3,566,165 | A | * | 2/1971 | Lohr ........................ 310/67 R |
| 4,257,497 | A | * | 3/1981 | Schroeder ................ 188/77 W |
| 5,163,528 | A | * | 11/1992 | Kawamoto et al. ........ 180/65.5 |
| 5,302,876 | A | * | 4/1994 | Iwamatsu et al. ....... 310/156.12 |
| 5,382,854 | A | * | 1/1995 | Kawamoto et al. ....... 310/67 R |
| 5,465,802 | A | * | 11/1995 | Yang ......................... 180/65.5 |
| 5,691,584 | A | * | 11/1997 | Toida et al. ............... 310/67 R |
| 5,796,192 | A | * | 8/1998 | Riepl ........................ 310/67 R |
| 5,920,136 | A | * | 7/1999 | Schmid ........................ 310/77 |
| 5,982,063 | A | * | 11/1999 | Lutz et al. .................... 310/77 |
| 6,133,669 | A | * | 10/2000 | Tupper ........................ 310/263 |
| 6,590,306 | B2 | * | 7/2003 | Terada ...................... 310/75 C |

FOREIGN PATENT DOCUMENTS

JP 49-132546 A 11/1974

* cited by examiner

Primary Examiner—Christopher P. Ellis
Assistant Examiner—Christopher Bottorff
(74) Attorney, Agent, or Firm—Birch, Stewart, Kolasch & Birch, LLP

(57) ABSTRACT

A drum brake for braking a wheel disposed on the inside in the radial direction of an electric motor. The drum of the drum brake and an electric motor are disposed separate from each other, and thus wear powders of a brake shoe do not adhere to a permanent magnet of the electric motor. As a result, the wear powders do not adversely influence the performance of the electric motor, and the performance of the electric motor is maintained. The electric motor and the drum brake are disposed concentrically, so that the width of the wheel is reduced. Thus, a small and compact wheel is realized.

20 Claims, 8 Drawing Sheets

WHEEL STRUCTURE

CROSS-REFERENCE TO RELATED APPLICATION

The present application claims priority under 35 U.S.C. §119 to Japanese Patent Application No. 2001-271640, filed Sep. 7, 2001, the entire contents of which are hereby incorporated by reference.

BACKGROUND OF THE INVENTION

1. Field of the Invention

The present invention relates to an electric motor built-in wheel structure, in which an electric motor is not influenced by wear powders of a brake mechanism and the brake mechanism is not influenced by beat of the electric motor, and which is small and compact.

2. Description of Background Art

One example of a conventional wheel structure for a vehicle is shown in Japanese Unexamined Utility Model No. Sho-49-132546, entitled "Electrically operated small vehicle".

FIG. 2 of the publication describes a wheel structure with a hub 5 rotatably attached to an axle 6 via a bearing 7, a tire 4 attached to the hub 5, and an electric motor disposed in a wheel by attaching an armature 9 to the axle 6 and attaching a field 8 to the hub 5.

A braking mechanism may be either a drum brake or a disc brake and is usually attached to a wheel. However, when attaching a brake mechanism to the above-described wheel, the brake mechanism is disposed between a sidewall of the hub 5 and the vehicle body side.

In such a structure, the wheel and the brake mechanism are arranged in a direction extending from the axle 6, so that vehicle width increases. Consequently, the structure is not suitable for a motorcycle, for example. Also, in the case where a drum brake is disposed in the wheel adjacent to the armature 9, the width of the wheel increases. Moreover, mechanism wear powders may adhere to the field 8 in the wheel, degrading the performance of the electric motor. In addition, heat generated by the electric motor may degrade the performance of the brake mechanism.

SUMMARY AND OBJECTS OF THE INVENTION

An object of the present invention, therefore, is to improve the wheel structure, and to prevent the electric motor from being adversely influenced by wear powders of the brake mechanism.

Another object of the present invention is to prevent the brake mechanism from being adversely influenced by heat generated by the electric motor and, at the same time, to provide a small, compact wheel having a built-in electric motor.

To achieve the above objects, the present invention provides a wheel structure for a vehicle, including a wheel with a built-in electric motor for driving the vehicle, and a brake mechanism for braking the wheel disposed on the inside in the radial direction of the electric motor.

When the brake mechanism and the electric motor are separated from each other, the wear powders of the brake mechanism do not adhere to a permanent magnet of the electric motor, and thus do not exert an adverse influence on the performance of the electric motor. Accordingly, the performance of the electric motor can be maintained.

The electric motor and the brake mechanism can be disposed concentrically, so that the width of the wheel can be reduced, and a small, compact wheel can be achieved.

Further, in the present invention, the electric motor and the brake mechanism are provided on the same side of a disc of the wheel.

Since the electric motor and the brake are provided on the same side of the disc of the wheel, the electric motor and the brake mechanism can be easily assembled onto the wheel, simplifying maintenance on the electric motor and the brake mechanism.

The present invention also provides that the brake mechanism is a drum brake, and includes an arm member for rotatably supporting the wheel, which serves as a brake panel of the drum brake. The stator of the electric motor is attached to the arm member. As a result, it is not necessary to provide a separate brake panel or member to which a stator is attached. Thus, as compared with conventional wheel structures, the number of parts can be decreased, and the cost of parts cost can be suppressed.

With the present invention, the parts of the drum brake and the stator can be subassembled to the arm member at the time of manufacture to boost efficiency.

The electric motor of the present invention includes a rotary magnet member rotating integrally with the wheel. The rotary magnet member has a magnetic ring and a permanent magnet fixed to the magnetic ring, and the magnetic ring is positioned in the wheel by a positioning pin.

In conventional structures, it is common for the stator to take the form of a coil, and a slip ring mechanism is needed for passing current to the stator. Since the present invention provides a wheel with a rotary magnet member, the extra components required in conventional devices become unnecessary, and structure is simplified. In the present invention, the rotary magnet member is formed by fixing the permanent magnet to the magnetic ring. Then the rotary magnet member is easily attached to the wheel.

In comparison to directly attaching the permanent magnet to the wheel, assembly performance is improved. The magnetic ring is prevented from rotating by the positioning pin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the invention will be described hereinbelow with reference to the attached drawings.

Figure 1:
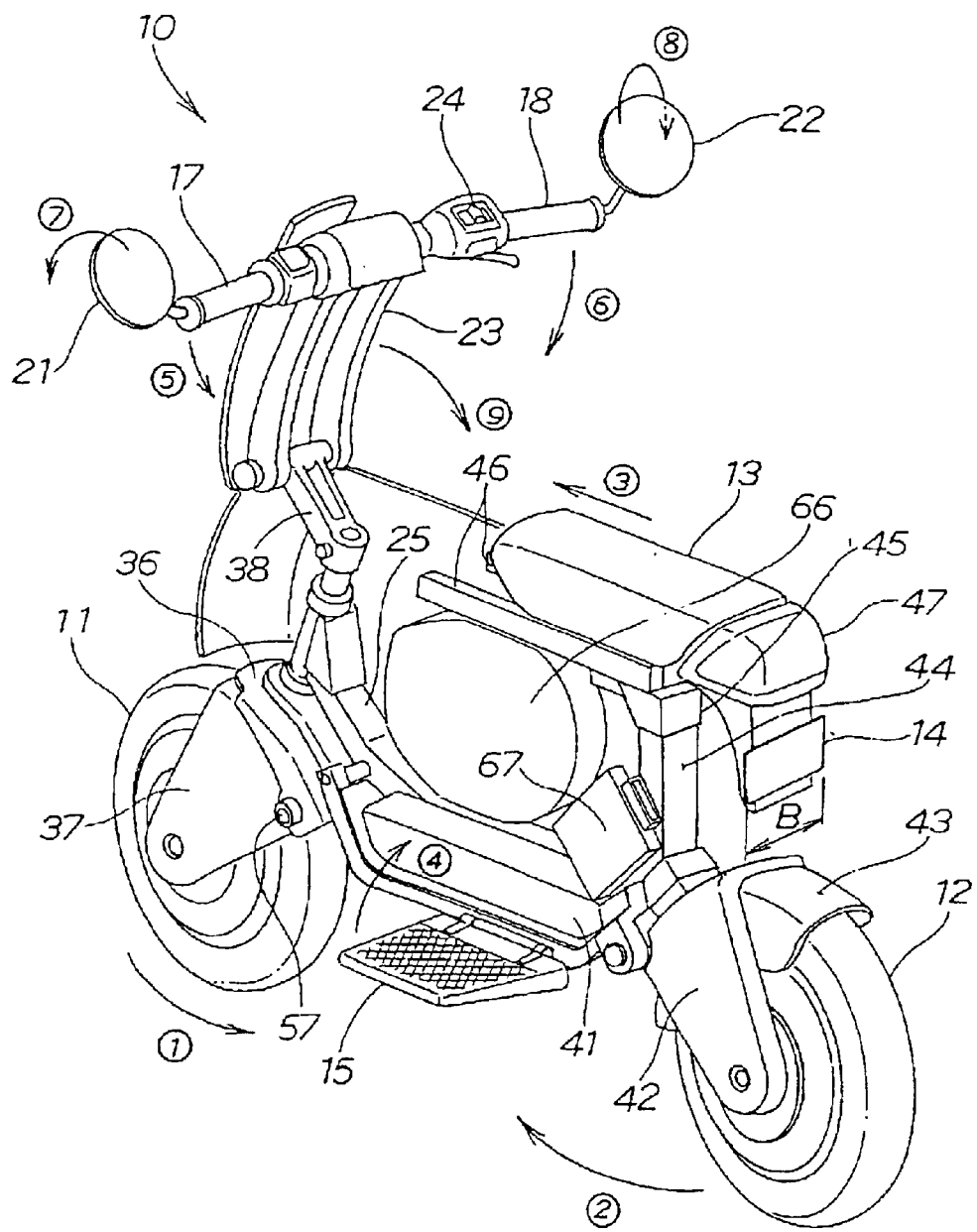
FIG. 1 is a perspective view of a foldable, two-wheel vehicle employing a wheel structure.

FIG. 1 is a perspective view of a foldable two-wheel vehicle employing a wheel structure according to the invention. A foldable two-wheel vehicle 10 is a has an outside dimension that can be reduced by folding a part of the vehicle, so that it can be mounted on and carried by a larger four-wheel vehicle.

In the two-wheel vehicle 10, a front wheel 11 and a rear wheel 12 can be moved, or folded, in the directions of the arrows ① and ②. A seat 13 moves forward in the direction of the arrow 3. Projected portions, such as steps 15 and 16 (step 16 on the depth side is not shown) on which the driver puts his/her feet, handlebars 17 and 18, and rear-view mirrors 21 and 22 are folded in the directions of the arrows ④ to ⑧, respectively, so as to be within the width B of a license plate 14 attached to the rear. A handle post 23 for supporting the handlebars 17 and 18 can be folded toward the rear portion of the vehicle in the direction of the arrow ⑨.

A motor operating switch 24 (folding switch) is provided for the handlebar 18 to operate an electric motor located in the rear wheel 12. This electric motor operates at a low speed to fold the front and rear wheels 11 and 12, or to unfold the front and rear wheels 11 and 12 to their original positions in a driving mode from the folded state. When a not-shown movable portion of the motor operating switch 24 is moved toward the side designated as "fold", the front and rear wheels 11 and 12 can be folded. When the movable portion is moved to the side designated as "unfold", the front and rear wheels 11 and 12 can be unfolded.

Figure 2:
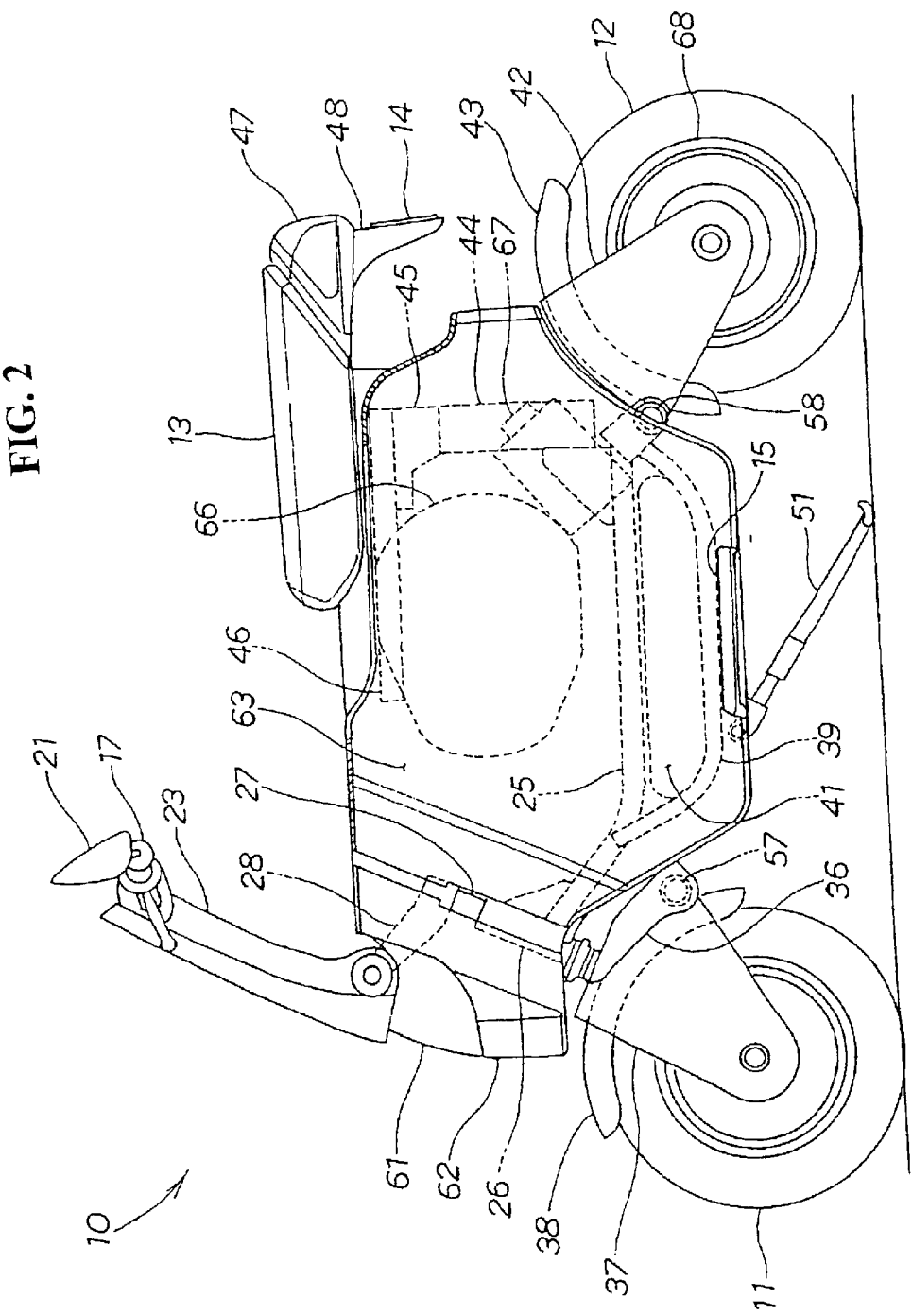
FIG. 2 is a side view of a two-wheel vehicle employing the wheel structure of the present invention.

FIG. 2 is a side view of a two-wheel vehicle employing the wheel structure according to the invention. In the two-wheel vehicle 10, a head pipe 26 is attached to the front end of a body frame 25, and a handle shaft 27 is rotatably attached to the head pipe 26. An upper arm 28 is attached to the upper end of the handle shaft 27, and the handle post 23 is attached to the upper arm 28 so as to be swingable in the longitudinal direction of the body frame 25. The pair of right and left handlebars 17 and 18 (the handlebar 18 on the depth side also serves as an accelerator, refer to FIG. 1) are attached on the handle post 23 so as to be foldable to the inside in the lateral direction. The rear-view mirrors 21 and 22 (the rear-view mirror 22 on the depth side is not shown) are attached to the tips of the handlebars 17 and 18, respectively, so as to be turnable in the front/rear directions with respect to the axes of the handlebars 17 and 18 as a center.

A lower arm 36 is attached to the lower end of the handle shaft 27, and a front swing arm 37 for holding the front wheel 11 from the left side is swingably attached to the rear part of the lower arm 36. The front wheel 11 is rotatably attached to the end of the front swing arm 37, and the upper portion of the front wheel 11 is covered with a front fender 38 attached to the front swing arm 37.

The two-wheel vehicle 10 also includes a pair of right and left underframes 39 attached to the lower portion of the body frame 25, and a pair of right and left batteries 41 attached on the underframes 39. A rear swing arm 42 is swingably attached to the rear part of the body frame 25, and the rear wheel 12 is rotatably attached to the tip of the rear swing arm 42. The upper portion of the rear wheel 12 is covered with a rear fender 43 attached to the rear swing arm 42. A seat post 44 is disposed vertically in the rear part of the body frame 25. A seat frame 45 and a pair of right and left seat rails 46 are attached to the upper end of the seat post 44, and the seat 13 is attached to the seat rails 46 so as to be slidable in the longitudinal direction of the body frame 25.

A tail lamp 47 is integrally attached to the rear portion of the seat 13, the number plate 14 is attached under the tail lamp 47 via a bracket 48, and a stand 51 is attached to the left underframe 39 in the lower part of the body frame 25 so as to be turnable in the vertical direction. In addition, the floor-like steps 15 and 16 (the step 16 on the depth side is not shown) are attached to the lower portions on the right and left sides of the body frame 25 so as to be able to turn upward.

The front swing arm 37 is mounted on a front swing shaft 57, and the rear swing arm 42 is mounted on a rear swing shaft 58. Front cover 62 is disposed under head lamp 61. Side covers 63 and 64 are located the right and left sides of the body (the side cover 64 on the depth side is not shown). In a state where the right and left side covers 63 and 64 are attached to each other, an opening is formed between the seat rails 46 and 46 under the seat 13, and a space is formed between the right and left side covers 63 and 64 in the opening, in which a helmet, or other items, can be stored. Housing net 66, for housing small articles, is provided below the seat rails 46 by being hooked on the seat rails 46. Control unit 67 is attached to the seat post 44.

The rear wheel 12 is a wheel of a wheel-in motor, such that an electric motor, to be described later. The electric motor is housed in a wheel 68, and is driven by the battery 41 and the control unit 67.

The seat 13 is slid from a riding position shown in the drawing to the rear part of the body, thereby opening the housing net 66. From the opening, small articles can be put into the housing net 66.

The folding action of the two-wheel vehicle 10 will be described briefly.

Figure 3:
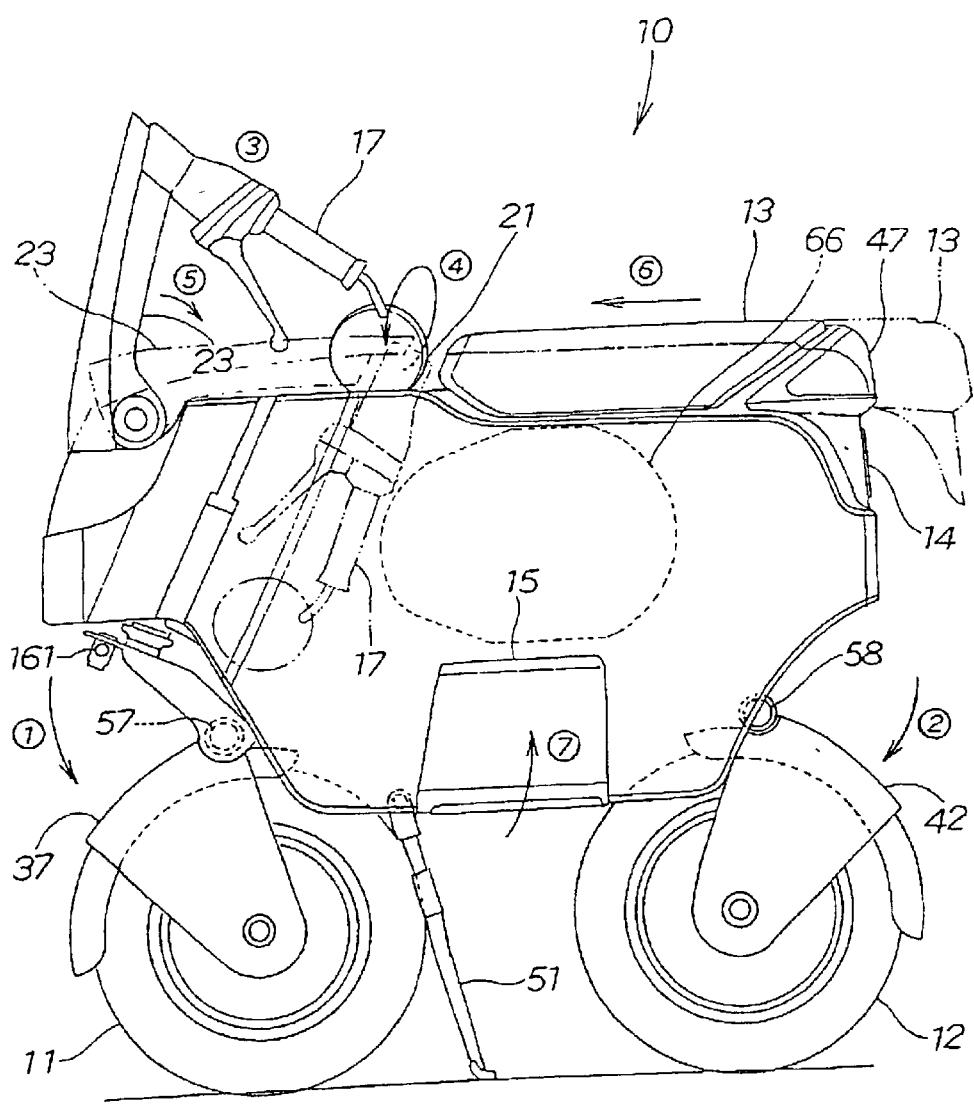
FIG. 3 is an action diagram illustrating folding of a two-wheel vehicle employing the wheel structure of the present invention.

FIG. 3 is an action diagram illustrating folding of the two-wheel vehicle employing the wheel structure of the present invention, and will be described in order.

In a state shown in FIG. 2, first, the brake is applied on the front wheel 11 to lock the front wheel 11 and a switch for making the electric motor in the rear wheel 12 operate is turned on. Specifically, the rear wheel 12 is rotated in the same rotating direction (forward rotation) as that in a driving mode. In FIG. 3, by the rotation, the rear wheel 12 approaches the front wheel 11, the front swing arm 37 on the front wheel 11 side and the rear swing arm 42 on the rear wheel 12 side swing in the directions of the arrows ① and ② around the front swing shaft 57 and the rear swing shaft 58 as a center, respectively. When the switch is turned on, the control unit releases the lock mechanism of the front and rear wheels, and drives the motor in a procedure which will be described herein.

As shown by ③, the handlebars 17 and 18 (the handlebar 18 on the depth side is not shown) are folded to the inside, and the rear-view mirrors 21 and 22 (the rear-view mirror 22 on the depth side is not shown) are folded as shown by the arrow ④. The handle post 23 is tilted to the rear portion of the body as shown by the arrow ⑤, and the handlebars 17 and 18 and the rear-view mirrors 21 and 22 are housed in the body via the opening. During the operation, the housing net 66 and the handlebars 17 and 18 do not interfere with each other. As such, the folding operation can be performed even when articles are being housed in housing net 66.

As shown by the arrow ⑥, the seat 13 is moved forward.

The steps 15 and 16 (the step 16 on the depth side is not shown) are folded upward, as shown by the arrow ⑦.

After performing the steps above, the operation of folding the two-wheel vehicle 10 is complete. However, the order of the folding steps is not limited to the above. For example, after moving the seat 13 forward, the handle post 23 may be tilted backward together with the folded handlebars 17 and 18.

By folding the front wheel 11 and the rear wheel 12, the minimum road clearance of the body becomes higher than that in the driving mode shown in FIG. 2. Consequently, the stand 51 is swung from the position shown in FIG. 2 to a downward position and fixed.

In a state where the two-wheel vehicle 10 is folded, the two-wheel vehicle 10 has an almost rectangular parallelepiped shape which is flat in the lateral direction, and has a width almost equal to the width of 170 mm of the number plate 14 of a motor-bike. Thus, the two-wheel vehicle 10 can be easily housed in a storage area of a four-wheel vehicle. In particular, it can be housed in an outer panel of the four wheel vehicle, so that, as the two wheel vehicle is mounted it provides reinforcement to the four-wheel vehicle.

Figure 4:
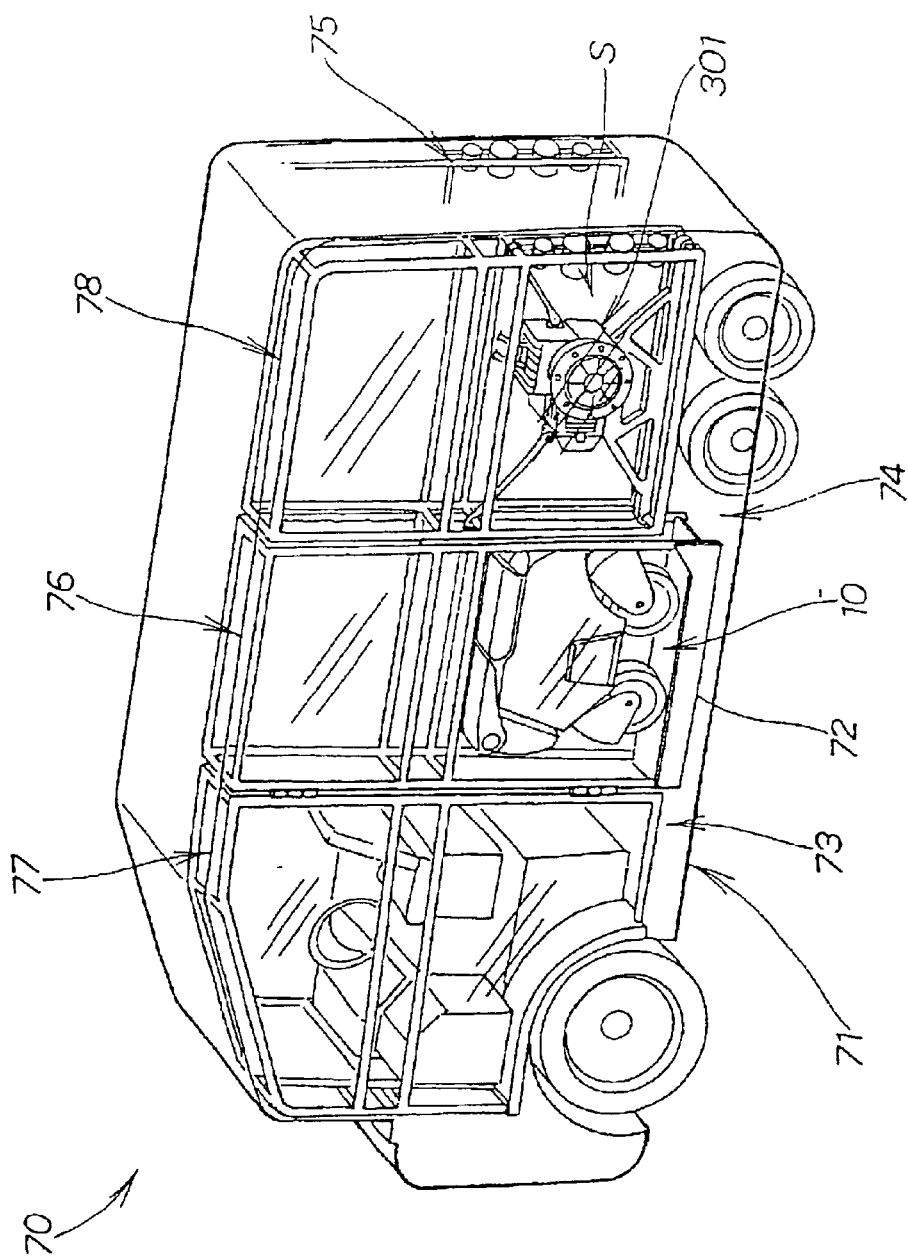
FIG. 4 is a perspective view showing a two-wheel vehicle employing the wheel structure of the present invention mounted on a four-wheel vehicle.

FIG. 4 is a perspective view showing the two-wheel vehicle according to the invention mounted in a four-wheel vehicle. Shown is a state where the two-wheel vehicle 10 is housed in a door 72 attached to a side body 71 of a four-wheel vehicle 70.

The parts of the two-wheel vehicle 10 are folded so that the vehicle width is within the width of the number plate 14 (refer to FIG. 3) as described above, so that the width of a space for housing the two-wheel vehicle 10 can be reduced and the door 72 can be made thin. Therefore, the space in the compartment of the four-wheel vehicle 70 is kept to a minimum while still being large enough to house the two wheel vehicle.

The four-wheel vehicle 70 has outer panels 76, 77, and 78 made of transparent or semi-transparent outer-panel material (such as glass) in the door 72. The four-wheel vehicle 70 also includes sidewalls 73 and 74 as body constructing members. Since the door 72 of the four wheel vehicle 70 is transparent, the two-wheel vehicle 10 can be seen from the outside. Accordingly, it can be seen at a glance whether or not the folded two-wheel vehicle 10 is mounted on the four-wheel vehicle 70. The attractiveness of the product is thus improved, and there is no worry that the user will forget to unload the two-wheel vehicle 10.

The four-wheel vehicle 70 also has an in-vehicle generator 301 disposed in a lower space S of the sidewall 74. The in-vehicle generator 301 is a water-cooled four-cycle engine integrated multi-pole alternator and a starter.

Figure 5:
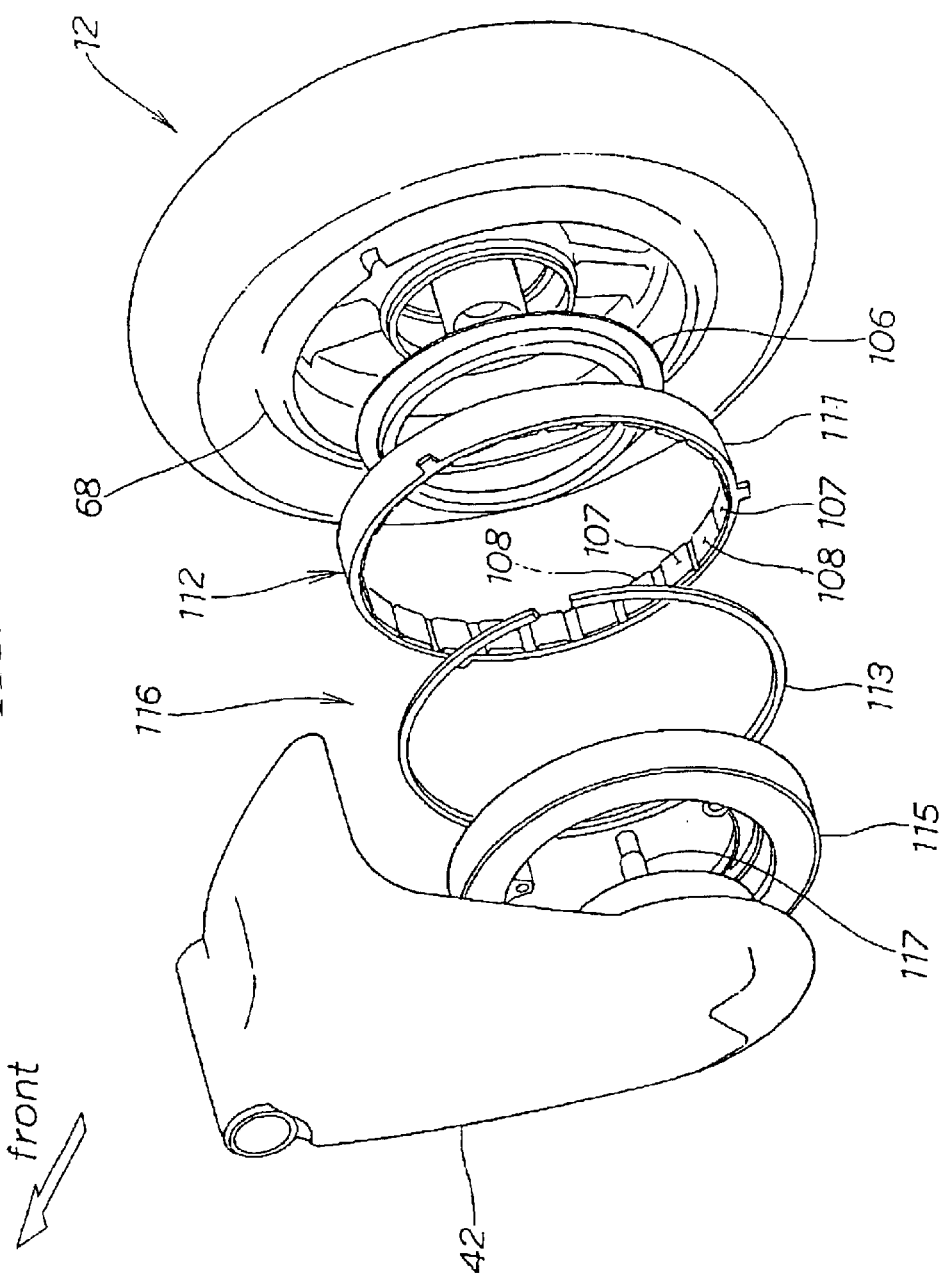
FIG. 5 is an exploded perspective view of the wheel structure of the present invention.

FIG. 5 is an exploded perspective view showing a wheel structure according to the invention, and shows the wheel 68 of the rear wheel 12.

The wheel 68 of the rear wheel 12 has a magnet ring 106 for a sensor, which is detected by a not-illustrated rotation sensor provided on the rear swing arm 42 side. The wheel 68 also includes a rotary magnet member 112 obtained by alternately arranging a plurality of permanent magnets 107 and 108 on the inside of a magnetic ring 111, and a fixing ring 113 for fixing the rotary magnet member 112 to the inside of the wheel 68. The rear swing arm 42 has a stator 115 for integrally supporting a stator coil (not shown).

The magnet ring 106 for a sensor is used to detect the rotational speed of the wheel 68.

The rotary magnet member 112 and stator 115 are components of a three-phase brushless electric motor 116. FIG. 5 also shows axle 117 of the rear wheel 12.

Figure 6:
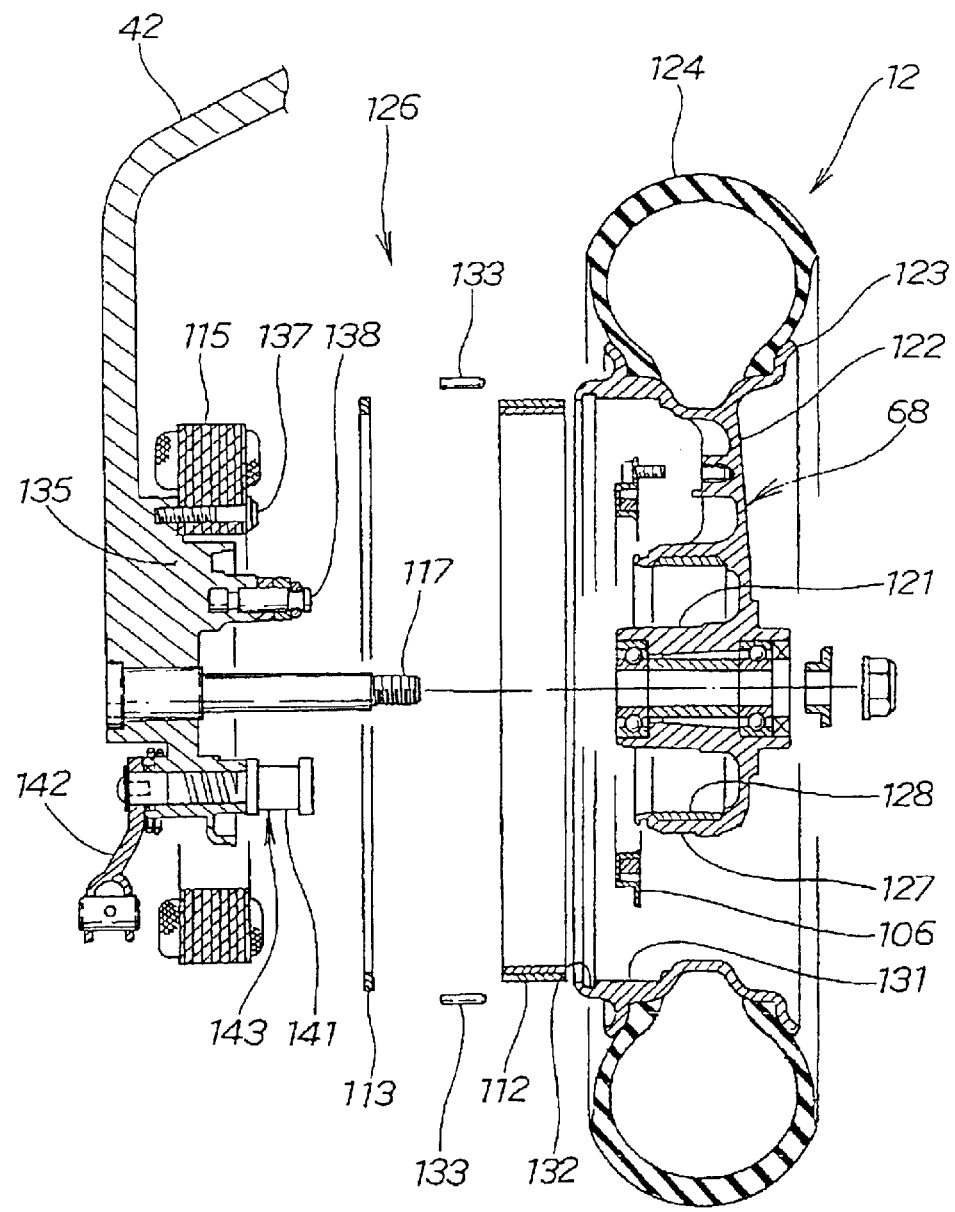
FIG. 6 is an exploded cross sectional view of the wheel structure according to the present invention.

FIG. 6 is a cross section (exploded view) showing the wheel structure according to the invention. The wheel 68 includes a hub 121 for receiving the axle 117, a disc 122 extending radially to the outside from the hub 121, and a rim 123 provided around the disc 122. The wheel 68 is a member in which a tire 124 is attached to the rim 123.

The disc 122 is a portion in which a drum 127 as a component of a drum brake 126 is integrally formed on the side facing the rear swing arm 42. A cast iron liner 128 is insert-molded on the inside of the drum 127 to increase wear resistance at the time when a brake shoe (described later) comes into contact. A magnet member fitting portion 131 is provided in the inner face of the rim 123, to which the rotary magnet member 112 is fit. Fixing ring 113 fits into an annular groove 132. Three positioning pins 133 (one of which is not shown), for positioning the rotary magnet member 112, are disposed at 120° intervals.

The rear swing arm 42 has a projection 135 around the axle 117. The stator 115 is attached to the projection 135 by bolts 137, and the projection 135 serves as a brake panel (a component of the drum brake 126).

Specifically, the projection 135 is a member to which brake shoe shafts 138 and 138 (one of which is not shown) and a camshaft 143 are attached. The brake shoe shafts 138 and 138 serve as swing shafts of a brake shoe (not shown) coming into contact with the inner face of the iron cast liner 128 of the drum 127. A cam 141 is formed at one end of the camshaft 143 for moving the brake shoe toward the drum 127 side. An arm member 142 is is integrally attached to the other end of the camshaft 143, and swings in association with the braking operation.

Figure 7:
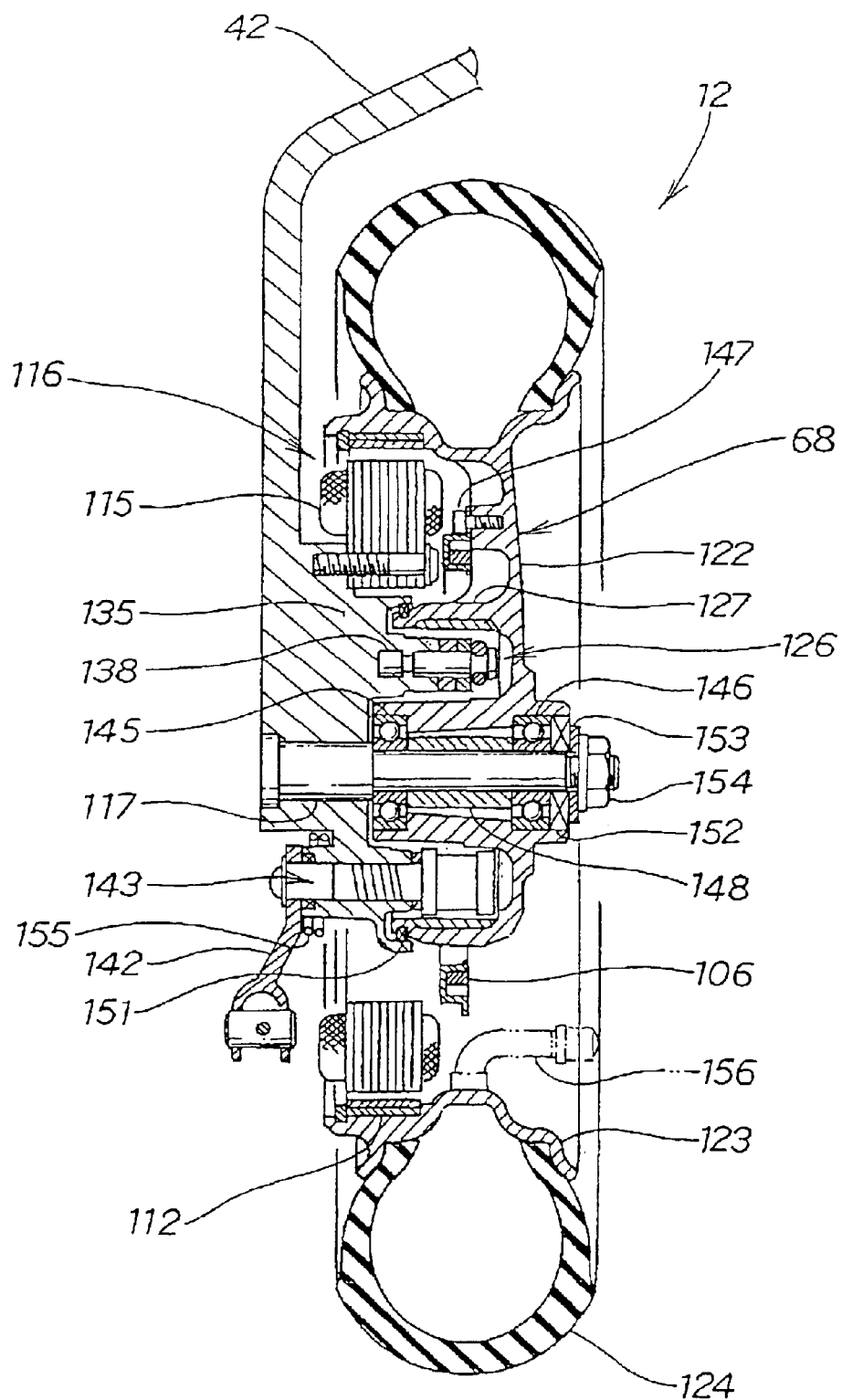
FIG. 7 is a cross sectional view of the wheel structure according to the present invention.

FIG. 7 is a cross section showing the wheel structure according to the invention. It shows axle 117, the stator 115 of the electric motor 116, brake shoe shafts 138 and 138 (one of which is not shown) of the drum brake 126, and the camshaft 143 attached to the projection 135 of the rear swing arm 42. The wheel 68 is rotatably attached to the axle 117 via bearings 145 and 146, the drum 127 of the drum brake 126 is integrally formed in the disk 122 of the wheel 68, the magnet ring 106 for a sensor is attached to the disk 122 by using bolts 147, and the rotary magnet member 112 is attached to the inner face of the rim 123.

FIG. 7 also shows collar 148, dust seals 151, and 152, a washer 153, a nut 154, a return spring 155 of the arm member 142, and an air valve 156 of the tire.

As described above, the wheel 68 has a built-in motor and a drum brake.

Figure 8:
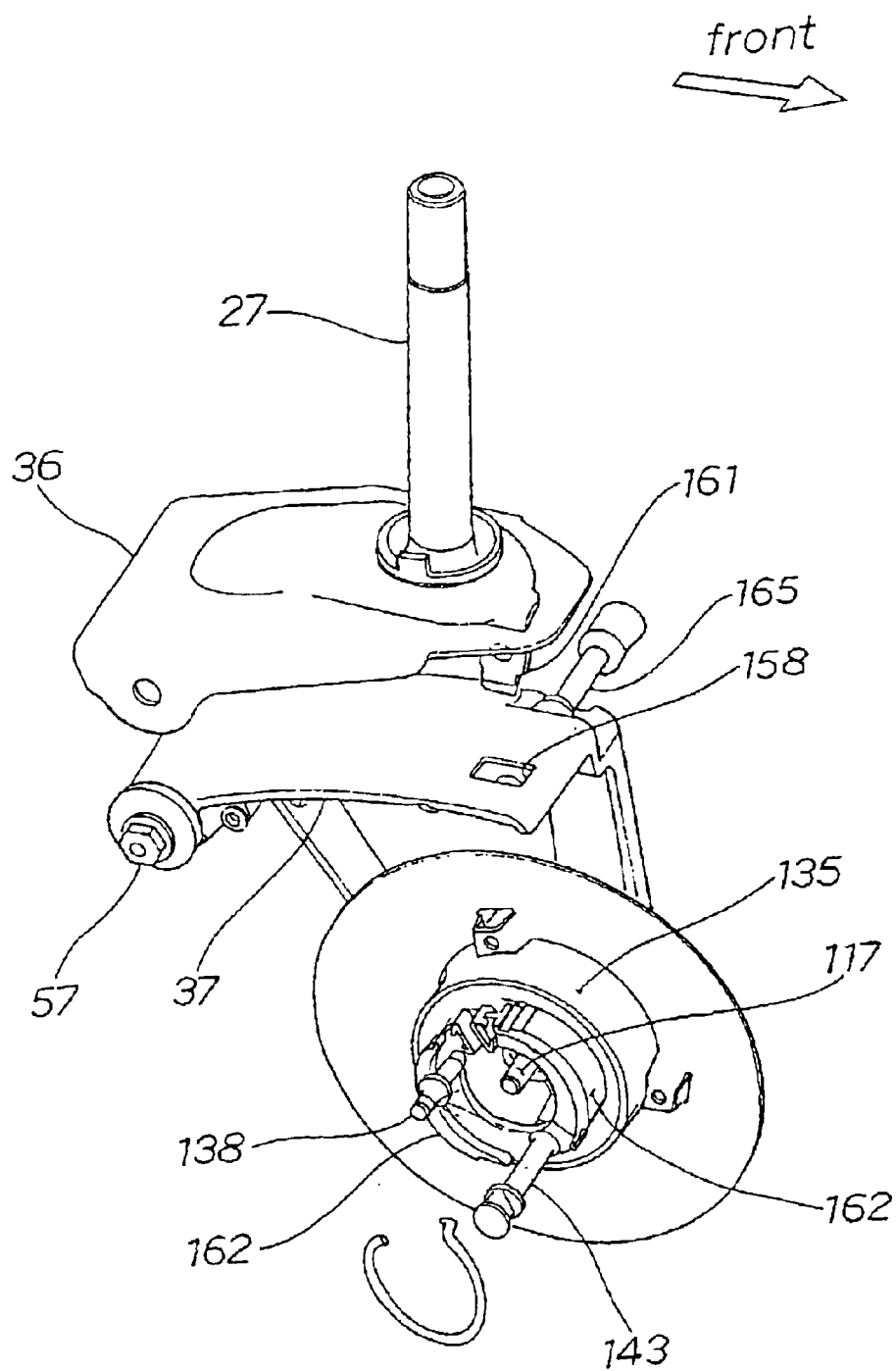
FIG. 8 is a perspective view showing a main portion on the front wheel side of a two-wheel vehicle employing the wheel structure of the present invention.

FIG. 8 is a perspective view of a main portion on the front wheel side of the two-wheel vehicle according to the invention. Projection 135 is provided for the front swing arm 37, the brake shoe shaft 138 and the camshaft 143 are attached to the projection 135, and brake shoes 162 and 162 are swingably attached to the brake shoe shaft 138. A window 158 is provided in the upper part of the front swing arm 37, a projected piece 161 is inserted into the window 158 to integrally connect the front swing arm 37 to the lower arm 36, and an arm lock pin 165 is slidably attached to the front swing arm 37 so as to be connected to the projected piece 161.

The brake shoes 162 and 162 are members also employed for the drum brake 126, as previously shown in FIGS. 6 and 7.

As described by referring to FIGS. 5 and 7, the invention includes a wheel 68 with a built-in electric motor 116 for driving the vehicle, and a drum brake 126 as a brake mechanism for braking the wheel 68 disposed on the inside in the radial direction of the electric motor 116.

The drum brake 126 and the electric motor 116 are separated from each other by the drum 127 of the drum brake 126. Thus, wear powders of the brake shoe 162 do not adhere to the permanent magnets 107 and 108 of the electric motor 116, and thus do not adversely influence the performance of the electric motor 116. Accordingly, the performance of the electric motor 116 can be maintained. The electric motor 116 and the drum brake 126 can be disposed concentrically, so that the width of the wheel 68 can be made narrow, and the wheel 68 can be small and compact.

Further, because of the drum 127, the heat of the electric motor 116 does not adversely influence the drum brake 126. Thus, the braking performance can be maintained.

As described earlier, the invention provides that the electric motor 116 and the drum brake 126 are disposed on the same side as the disc 122 of the wheel 68, that is, on the side facing the rear swing arm 42 of the disc 122.

The electric motor 116 and drum brake 126 are provided on the same side of the disc 122 of the wheel 68. As a result, the magnet ring 106 for a sensor of the electric motor 166, rotary magnet member 112, brake shoe shaft 138 of the drum brake 126, camshaft 143, and the brake shoe can be assembled from the same side of the disc 122 to the wheel 68. Thus, the performance of assembling the electric motor 116 and drum brake 126 to the wheel 68 can be improved.

In addition, maintenance on the electric motor 116 and drum brake 126 can be performed from the same side of the disc 122. Thus, the performance of maintenance on the electric motor 116 and drum brake 126 can also be improved.

As shown in FIG. 6, the rear swing arm 42 rotatably supports the wheel 68. The rear swing arm 42 is provided with the projection 135, which serves as a brake panel of the drum brake 126. The stator 115 of the electric motor 116 is attached to the rear arm member 126.

Since the rear swing arm 42 serves both as the brake panel of the drum brake 126 and as the member to which the stator 115 is attached, the separately-provided brake panel and attaching member for a stator needed in conventional wheel structures, are not necessary with the present invention. As a result, the number of parts can be decreased, and the cost of the parts can be decreased. At the time of manufacture, the parts (such as the brake shoe shaft 138, brake shoe, camshaft 143, and arm member 142) of the drum brake 126 and the stator 115 can be subassembled to the rear swing arm 42. Separately, the magnetic ring 106 for a sensor and the rotary magnet member 112 may be subassembled to the wheel 68. By attaching the subassembled wheel 68 to the subassembled rear swing arm 42, the productivity of assembly can be increased.

In the present invention, the rotary magnet member 112 rotating integrally with the wheel 68 is provided for the electric motor 116. The rotary magnet member 112 has the magnetic ring 111 and the permanent magnets 107 and 108 fixed to the magnetic ring 111, and the magnetic ring 111. The rotary magnet member is positioned to the wheel 68 by means of the positioning pin 133.

By providing the wheel 68 with the rotary magnet member 112, parts needed in conventional structures, such as a stator in the form of a coil and a slip ring mechanism for passing current to the stator, become unnecessary in the present invention. Thus, the structure is simplified. By fixing the permanent magnets 107 and 108 fixed to the magnetic ring 111, the magnetic ring 111 thus formed can be easily attached to the wheel 68 in a single operation. As a result, as compared with the case where the permanent magnets 107 and 108 are directly attached to the wheel 68, assembly performance can be improved.

Further, the positioning pin 133 prevents the magnetic ring 111 from rotating.

Although the motor built-in wheel with a drum brake is employed as the rear wheel in the invention, the invention is not limited to the configuration. The motor built-in wheel with a drum brake may be employed as the front wheel, or as front and rear wheels. The brake mechanism is not limited to the drum brake, but may be a disc brake.

The invention described above displays the following effects.

In the wheel structure of the present invention, the brake mechanism for braking the wheel is disposed on the inside in the radial direction of the electric motor. Since the brake mechanism and the electric motor are separated from each other, the wear powders of the brake mechanism are prevented from exerting an adverse influence on the electric motor. Thus, the performance of the electric motor is maintained.

Also, since the electric motor and the brake mechanism are disposed concentrically, the width of the wheel can be reduced, and a small and compact wheel can be achieved.

Further, in the wheel structure of present invention, the electric motor and the brake mechanism are provided on the same side of a disc of the wheel. Consequently, performance of assembling the electric motor and the brake mechanism to the wheel, as well as the performance of maintenance on the electric motor and the brake mechanism can be improved.

In present invention also provides that the brake mechanism is a drum brake, and that an arm member for rotatably supporting the wheel is a member which serves as a brake panel of the drum brake and to which a stator of the electric motor is attached. Therefore, as compared with conventional structures, in which a specially provided brake panel and a member for attaching a stator are necessary, the number of parts can be decreased. Thus, the cost of parts can be suppressed.

Further, parts of the drum brake and the stator can be subassembled to the arm member at the time of manufacture. By attaching the wheel to the arm member to which the parts are subassembled, assembly productivity can be increased.

In addition, as described above, the electric motor of the present invention has a rotary magnet member rotating integrally with the wheel. The rotary magnet member has a magnetic ring and a permanent magnet fixed to the magnetic ring, and the magnetic ring is positioned in the wheel by a positioning pin. Consequently, as compared with conventional structure in which the stator is provided in the form of a coil, a slip ring mechanism is provided for passing current to the stator, these parts become unnecessary in the present invention. Thus, the structure is simplified.

Also, by constructing the rotary magnet member by the magnetic ring and the permanent magnet fixed to the magnetic ring, the magnetic ring to which the permanent magnet is preliminarily fixed can be easily attached to the wheel. Therefore, as compared with conventional structures, in which the permanent magnet is attached directly to the wheel, assembly performance can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A wheel structure for a vehicle, comprising:
   a wheel with a built-in electric motor for driving said vehicle, the electric motor having a rotary magnet member with a cylindrical outer surface fitted against a cylindrical inner surface of the wheel;
   a brake mechanism for braking the wheel disposed on an inside of said wheel in a radial direction of said electric motor; and
   a swing arm for rotatably supporting said wheel, the swing arm serving as a brake panel of the brake mechanism.

2. The wheel structure according to claim 1, wherein said electric motor and the brake mechanism are provided on the same side of a disc of the wheel.

3. The wheel structure according to claim 1, wherein said brake mechanism is a drum brake.

4. The wheel structure according to claim 1, further comprising:
   a stator of the electric motor attached to the swing arm.

5. The wheel structure according to claim 4, wherein the swing arm includes a projection around an axle which serves as said brake panel, and a pair of brake shoe shafts are attached to the projection.

6. The wheel structure according to claim 3, further comprising;
   a swing arm for rotatably supporting said wheel, the swing arm serving as a brake panel of the drum brake; and
   a stator of the electric motor attached to the swing arm.

7. The wheel structure according to claim 6, wherein the swing arm includes a projection around an axle which serves as said brake panel, and a pair of brake shoe shafts are attached to the projection.

8. The wheel structure according to claim 1, wherein said rotary magnet member rotates integrally with the wheel, the rotary magnet member having a magnetic ring and a permanent magnet fixed to the magnetic ring, and the magnetic ring being positioned in the wheel by a positioning pin.

9. The wheel structure according to claim 8, wherein the positioning pin includes at least three positioning pins for positioning the magnetic ring.

10. The wheel structure according to claim 8, wherein a rim of the wheel is provided with a magnetic member fitting portion to which the rotary magnet member is fit.

11. A wheel structure for a vehicle, comprising:
    a wheel with a built-in electric motor for driving said vehicle;
    a brake mechanism for braking the wheel, the brake mechanism being disposed on an inside in a radial direction of said electric motor; and
    a swing arm for rotatably supporting said wheel, the swine arm serving as a brake panel of the brake mechanism,
    the electric motor further comprising a rotary magnet member having a magnetic ring and a permanent magnet fixed to the magnetic ring, the magnetic ring having a cylindrical outer surface fitting against a cylindrical inner surface of the wheel so that the rotary magnet member rotates integrally with the wheel.

12. The wheel structure according to claim 11, wherein said electric motor and the brake mechanism are provided on the same side of a disc of the wheel.

13. The wheel structure according to claim 11, wherein said brake mechanism is a drum brake.

14. The wheel structure according to claim 11, further comprising:
    a stator of the electric motor attached to the swing arm.

15. The wheel structure according to claim 14, wherein the swing arm includes a projection around an axle which serves as said brake panel, and a pair of brake shoe shafts are attached to the projection.

16. The wheel structure according to claim 13, further comprising:
    a swing arm for rotatably supporting said wheel, the swing arm serving as a brake panel of the drum brake; and
    a stator of the electric motor attached to the swing arm.

17. The wheel structure according to claim 14, wherein the swing arm includes a projection around an axle which serves as said brake panel, and a pair of brake shoe shafts are attached to the projection.

18. The wheel structure according to claim 11, further comprising a positioning pin for positioning the magnetic ring.

19. The wheel structure according to claim 18, wherein the positioning pin includes at least three positioning pins for positioning the magnetic ring.

20. The wheel structure according to claim 18, wherein a rim of the wheel is provided with a magnetic member fitting portion to which the rotary magnet member is fit.

* * * * *